United States Patent
Ortner et al.

(10) Patent No.: US 12,220,762 B2
(45) Date of Patent: Feb. 11, 2025

(54) DEVICE AND METHOD FOR PROCESSING A WORKPIECE ALONG A PREDETERMINED PROCESSING LINE USING A PULSED POLYCHROMATIC LASER BEAM AND A FILTER

(71) Applicant: SCHOTT AG, Mainz (DE)

(72) Inventors: Andreas Ortner, Gau-Algesheim (DE); Fabian Wagner, Mainz (DE); Albrecht Seidl, Niedernberg (DE); Simon Schmitt, Wiesbaden (DE); Frank-Thomas Lentes, Bingen (DE); Jens Ulrich Thomas, Mainz (DE)

(73) Assignee: SCHOTT AG, Mainz (DE)

( * ) Notice: Subject to any disclaimer, the term of this patent is extended or adjusted under 35 U.S.C. 154(b) by 422 days.

(21) Appl. No.: 16/687,231

(22) Filed: Nov. 18, 2019

(65) Prior Publication Data
US 2020/0101561 A1 Apr. 2, 2020

Related U.S. Application Data

(63) Continuation of application No. PCT/EP2018/062365, filed on May 14, 2018.

(30) Foreign Application Priority Data

May 17, 2017 (DE) .................. 10 2017 208 290.9

(51) Int. Cl.
*B23K 26/06* (2014.01)
*B23K 26/00* (2014.01)
(Continued)

(52) U.S. Cl.
CPC ........ *B23K 26/0648* (2013.01); *B23K 26/046* (2013.01); *B23K 26/0622* (2015.10);
(Continued)

(58) Field of Classification Search
CPC .................. B23K 26/0624; B23K 26/064; B23K 26/083; B23K 26/53; B23K 26/0006; B23K 2103/42; B23K 2103/52; B23K 2103/54
See application file for complete search history.

(56) References Cited

U.S. PATENT DOCUMENTS

9,270,080 B1 * 2/2016 Clowes ................. G01J 3/0218
2005/0024743 A1 2/2005 Camy-Peyret
(Continued)

FOREIGN PATENT DOCUMENTS

| CN | 101274391 | 10/2008 |
|----|-----------|---------|
| CN | 102785031 | 11/2012 |

(Continued)

OTHER PUBLICATIONS

Strickland et al., Compression of amplified chirped optical pulses, Optics Communications, vol. 56(3), 1985 (Year: 1985).*
(Continued)

*Primary Examiner* — Joe E Mills, Jr.
(74) *Attorney, Agent, or Firm* — Ruggiero McAllister & McMahon LLC (57) ABSTRACT

Devices and methods for processing a workpiece along a predetermined processing line are provided. The device includes: a pulsed, polychromatic laser beam generator; an optical arrangement; and a moving device. The laser beam generator generates a laser beam along a beam direction. The optical arrangement generates a focal line along the beam direction. The optical arrangement has a chromatic aberration for wavelength-dependent focusing of the laser beam and a filter for wavelength-dependent filtering of the laser beam. The moving device generates relative movement between the laser beam and the workpiece along the predetermined processing line.

20 Claims, 8 Drawing Sheets

(51) Int. Cl.
    *B23K 26/046* (2014.01)
    *B23K 26/0622* (2014.01)
    *B23K 26/064* (2014.01)
    *B23K 26/066* (2014.01)
    *B23K 26/08* (2014.01)
    *B23K 26/53* (2014.01)
    *B23K 101/40* (2006.01)
    *B23K 103/00* (2006.01)
    *C03B 33/02* (2006.01)

(52) U.S. Cl.
    CPC ........ *B23K 26/0624* (2015.10); *B23K 26/064* (2015.10); *B23K 26/066* (2015.10); *B23K 26/083* (2013.01); *B23K 26/53* (2015.10); *C03B 33/0222* (2013.01); *B23K 26/0006* (2013.01); *B23K 2101/40* (2018.08); *B23K 2103/42* (2018.08); *B23K 2103/52* (2018.08); *B23K 2103/54* (2018.08)

(56) References Cited

U.S. PATENT DOCUMENTS

| | | |
|---|---|---|
| 2005/0205536 A1 | 9/2005 | Norikane |
| 2006/0289410 A1 | 12/2006 | Morita |
| 2008/0239300 A1 | 10/2008 | Watanabe |
| 2010/0025387 A1* | 2/2010 | Arai .................. B29C 65/1654 219/121.73 |
| 2012/0255935 A1* | 10/2012 | Kakui .................. B23K 26/40 219/121.6 |
| 2013/0126573 A1* | 5/2013 | Hosseini ............ B23K 26/0006 225/2 |
| 2014/0199519 A1* | 7/2014 | Schillinger ............ B23K 26/53 219/121.75 |
| 2015/0165560 A1* | 6/2015 | Hackert .............. C03B 33/0222 428/131 |
| 2015/0166397 A1 | 6/2015 | Marjanovic |
| 2015/0185492 A1 | 7/2015 | Nagano |
| 2015/0232369 A1 | 8/2015 | Marjanovic |
| 2016/0001397 A1 | 1/2016 | Eun |
| 2016/0009066 A1* | 1/2016 | Nieber .................. B23K 26/53 156/272.8 |
| 2016/0031745 A1* | 2/2016 | Ortner .................. B23K 26/53 65/157 |
| 2016/0167166 A1 | 6/2016 | Nagano |
| 2016/0268758 A1* | 9/2016 | Knight .............. H01S 3/094003 |
| 2017/0189991 A1 | 7/2017 | Gollier |
| 2017/0304941 A1 | 10/2017 | Usuda |
| 2018/0117708 A1 | 5/2018 | Ortner |
| 2018/0134604 A1 | 5/2018 | Ortner |
| 2018/0134606 A1 | 5/2018 | Wagner |
| 2018/0221991 A1 | 8/2018 | Ortner |
| 2018/0297887 A1 | 10/2018 | Spier |
| 2018/0370840 A1 | 12/2018 | Plapper |
| 2019/0322564 A1 | 10/2019 | Wagner |

FOREIGN PATENT DOCUMENTS

| | | |
|---|---|---|
| CN | 103964682 | 8/2014 |
| CN | 106029590 | 10/2016 |
| DE | 10325942 | 1/2005 |
| DE | 102008029459 | 2/2010 |
| DE | 102012110971 | 5/2014 |
| DE | 102015110422 | 12/2016 |
| DE | 102015111490 | 1/2017 |
| DE | 102015111491 | 1/2017 |
| DE | 102015116846 | 4/2017 |
| DE | 102015116848 | 4/2017 |
| DE | 102015120950 | 6/2017 |
| DE | 102016102768 | 8/2017 |
| DE | 102017100015 | 7/2018 |
| DE | 102017100755 | 7/2018 |
| DE | 102017206461 | 10/2018 |
| EP | 2250529 | 11/2010 |
| EP | 2754524 | 7/2014 |
| JP | 2004337903 | * 12/2004 |
| JP | 2010158686 | 7/2010 |
| KR | 101407994 | 6/2014 |
| WO | 2009153067 | 12/2009 |
| WO | 2016059915 | 4/2016 |
| WO | 2016077171 | 5/2016 |

OTHER PUBLICATIONS

RP-photonics (Year: 2017).*
English translation of Written Opinion dated Sep. 6, 2018 for International Application No. PCT/EP2018/062365, 5 pages.
International Preliminary Report on Patentability dated Nov. 19, 2019 for International Application No. PCT/EP2018/062365, with English translation, 11 pages.
English translation of International Search Report dated Sep. 6, 2018 for International Application No. PCT/EP2018/062365, 2 pages.

* cited by examiner

DEVICE AND METHOD FOR PROCESSING A WORKPIECE ALONG A PREDETERMINED PROCESSING LINE USING A PULSED POLYCHROMATIC LASER BEAM AND A FILTER

CROSS REFERENCE TO RELATED APPLICATIONS

This application is a continuation of International Application PCT/EP2018/062365 filed May 14, 2018, which claims the benefit of German Application 10 2017 208 290 filed May 17, 2017, the entire contents of all of which are incorporated herein by reference.

BACKGROUND

1. Field of the Invention

The invention relates to a device and a method for processing a workpiece, in particular a workpiece which comprises glass or glass ceramic, along a predetermined processing line.

2. Description of Related Art

Devices and methods for processing, in particular for separating or filamenting and subsequently separating, workpieces, in particular made of glass or glass ceramic, along a predetermined processing line using pulsed laser beams have been known for some years.

By using the Kerr effect, with a sufficiently high intensity of a laser beam, for a nonlinear interaction between the electromagnetic field of the laser beam and a workpiece, self-focusing of the laser beam takes place, in which focal diameters significantly smaller than the diameter of a Gaussian beam are achieved. Because of the high intensity at the focus, a plasma is created in the workpiece, which has a defocusing effect on the laser beam. If the intensity of the remaining laser beam is high enough, the laser beam is refocused, etc. By repeated use of nonlinear focusing and plasma-induced defocusing of the laser beam in mutual equilibrium, the formation of a quasi "waveguide" takes place, which is also referred to as a filament. In a workpiece which is substantially transparent for the laser beam, the laser beam guided in this way has a modifying effect on the workpiece along its path: the formation of filamentary modifications occurs in the workpiece, which with suitable process management (for example burst mode of the laser source) may be configured in the form of microchannels with diameters in the submicrometer range (US 2013/0126573 A1).

As an alternative, in a development of filamentation, it has been found advantageous to use special optical arrangements which make it possible to form a focus elongated along the laser beam axis (beam direction), often also referred to as a focal line. To this end, for example, so-called axicons or lenses with a large spherical aberration are used (EP 2 754 524 A1), which have the particular property of imaging laser beam components as a function of their distance from the laser beam axis onto different focal points along a region in the propagation direction (beam direction) behind the optical arrangement. The formation of a focal line lying in the laser beam axis therefore takes place, the length of which may be predicted by established functional dependencies. The intensity distribution transversely to the optical laser beam axis is in this case described by the mathematics of Bessel functions; a so-called Bessel beam is formed along the laser beam axis. The advantage of this method is that the filament does not need to be adjusted by the equilibria, which is complicated to set up, of self-focusing and plasma defocusing, but rather the energy of the laser beam is brought into the direction of the laser beam axis continuously from all sides, so that a "continuous" intensity distribution is formed in the overlap region along the optical laser beam axis, the specific profile of which distribution is crucially influenced by the intensity distribution of the original laser beam. Examples of typical intensity profiles when using a Gaussian beam or an ideal top-hat profile (i.e. a portionwise constant function, the function value of which is reached at the edges of the portion by a (usually steep) continuous transition) are described in CN 102785031 A.

The distribution of the intensity which may be introduced into a workpiece, along the original propagation of the laser beam, has a crucial influence on the length of the filament.

When using a burst mode, by the cumulative effect of the repetition of laser pulses introduced at high frequency at a position a transient thermal effect of the laser beam may be induced, which are beyond modification of the material of the workpiece leads to lasting predamage in the form of microchannels: in detail, the microchannel is created by the first pulse of the burst pulse train, and the size of the damage zone around the microchannel is adjusted by the subsequent pulses of the burst as well as the material parameters.

If the workpiece moves during the filamentation along a predetermined processing line (for example x-y coordinates, or coordinates along the surface of the workpiece, setpoint contour), it will be quasi-perforated along this processing line by the microchannels produced next to one another at a predetermined distance. By subsequent separating processes, for example generation of a thermal shock with a $CO_2$ laser (cleaving), the microchannels may be connected to one another by cracks and the workpiece may be separated along the processing line (US 2015/165560 A). Advantages of fracture surfaces produced in this way are their low roughness, outstanding geometrical accuracy and strength of the workpiece edges produced.

For workpieces with a thickness greater than the length of the focal line, the method may be applied by successive deviation to different material depths even to relatively thick workpieces, for example with thicknesses of from 4 mm to 16 mm.

A disadvantage with the described method is that the transformation of a Gaussian beam which is "ideal" in terms of the laser source into a Bessel beam leads to an inhomogeneous intensity distribution in the focal line, and therefore to inhomogeneities in the fracture surface of the workpiece to be processed. Deviations from the ideal Gaussian beam ($M^2 > 1$) additionally degrade the situation. The top-hat profile, which is ideal in terms of the filament to be generated, can however be produced only with difficulty.

Further devices or methods for processing workpieces by means of a pulsed laser beam are described in the following documents: DE 10 2012 110 971 A1, DE 10 2015 110 422 A1, DE 10 2015 116 848 A1, DE 10 2015 111 491 A1, DE 10 2015 116 846 A1, DE 10 2015 111 490 A1, DE 10 2015 120 950 A1, DE 10 2016 102 768 A1, DE 10 2017 100 015.1, DE 10 2017 206 461.7, DE 10 2017 100 755.5, DE 10 2017 103 381.5, EP 2 754 524 A1, US 2005/0024743 A1, KR 101 407994 B1.

Furthermore, the following devices and methods for processing, in particular for separating or filamenting and subsequently separating workpieces made of glass or glass ceramic, along a predetermined processing line using pulsed polychromatic laser beams are known.

US 2012/0255935 A1 describes a method for processing a workpiece by means of a pulsed polychromatic laser beam. By means of a lens, a focal line is generated along the beam direction of the laser beam, the focal line consisting of a plurality of focuses.

US 2016/167166 A1 describes material processing with a laser beam of adjustable focal length.

JP 2010-158686 A describes material processing with a multispectral energy source by generating a linear focus.

WO 2016/077171 A2 describes common collinear threading of the beams of a plurality of laser sources into a common beam guiding system and processing of a workpiece by means of laser beams by wavelength-dependent focusing at different material depths of the workpiece.

US 2005/0205536 A1 discloses a method and a device for structuring materials by means of a laser beam, the focused laser beam having an adjusted wavelength distribution pattern.

EP 2 250 529 B1 discloses a source of optical supercontinuum radiation.

The laser processing of laminates is described in document US 2016/0009066 A1.

In the known devices and methods, the processing depth in a workpiece cannot be selectively adjusted, or can be selectively adjusted only very elaborately, and inaccurately. The workpieces processed in this way sometimes cannot even be separated along a processing line, or only very inaccurately or with inadequate separating edges, by external action, in particular by mechanical or thermal action.

SUMMARY

It is an object of the invention to provide a device and a method for processing a workpiece along a predetermined processing line by means of a pulsed polychromatic laser beam. The device and method are, in particular, intended to be suitable for processing workpieces made of glass or glass ceramic, or workpieces which comprise glass or glass ceramic, for example stacks of glass or glass ceramic sheets, stacks of glasses and glass ceramics of different chemical composition, glass-plastic laminates. In particular, the processed workpiece is intended to be separable easily, accurately and reproducibly by external action along the predetermined processing line, in particular by mechanical or thermal action.

The object is achieved by a device for processing a workpiece along a predetermined processing line, comprising at least means for generating a pulsed polychromatic laser beam, an optical arrangement for generating a focal line along the beam direction of the laser beam, the optical arrangement having chromatic aberration for wavelength-dependent focusing of the laser beam and at least one filter for wavelength-dependent filtering of the laser beam, means for generating a relative movement between the laser beam and the workpiece along the predetermined processing line, in order to process the workpiece by means of action of the focused laser beam.

The device for processing a workpiece along a predetermined processing line thus comprises the following means: means for generating a pulsed polychromatic laser beam, an optical arrangement a) having chromatic aberration for wavelength-dependent focusing of the laser beam, and having b) at least one filter for wavelength-dependent filtering of the laser beam, for generating a focal line along the beam direction of the laser beam, means for generating a relative movement between the laser beam and the workpiece along the predetermined processing line, in order to process the workpiece by means of action of the focal line of the laser beam (laser beam focal line).

DETAILED DESCRIPTION

The inventors have been able to show that, by means of the device according to the invention, the processing depth in a workpiece may be adjusted selectively and accurately. The device is highly suitable, in particular, for processing workpieces made of glass or glass ceramic, or workpieces which comprise glass or glass ceramic, for example stacks of glass or glass ceramic sheets, stacks of glasses and glass ceramics of different chemical composition, glass-plastic laminates.

With a pulsed polychromatic laser beam, having in particular a certain pulse duration and having certain wavelengths of the laser beam, by means of the optical arrangement having chromatic aberration for wavelength-dependent focusing of the laser beam and having at least one filter for wavelength-dependent filtering of the laser beam, it is possible to produce a focal line along the beam direction of the workpiece, with which the processing depth of the workpiece may be adjusted selectively and accurately. In particular, the length of the focal line may be adjusted by generating different foci.

By means of a filter, at least one wavelength of the laser beam may be selectively filtered, so that selectively no focus is formed at least at a particular position in the focal line. In particular, by unilateral or bilateral limiting of the optical spectrum (introduction of a band edge filter, or bandpass filter), it is possible to define a start or end point of the focal line. In a separate embodiment, in particular the endpoint (on the side facing away from the laser) is adjusted in a defined way, for example to avoid processing of a support on which the workpiece is resting.

In further embodiments, workpieces, in particular glass-metal laminates, processed from the glass side without modification or ablation of the metal. In a further embodiment, the microchannels produced along the focal line are used for direct through-contacting onto the metal layer, which—depending on the process sequence—may be structured before or after the through-contacting. Typical diameters of the microchannels are preferably less than 1 µm, particularly preferably less than 500 nm, more particularly preferably less than 300 nm.

By means of the optical arrangement, the filament may be converted by a chromatically induced transformation of the incident light beam into a Bessel-like beam. DE 103 25 942 A1 and DE 10 2008 029 459 A1 present special optics, or lenses, the chromatic aberration of which has been deliberately increased in order, as a function of the wavelength, to induce focusing of the beam components over a region of the focal line thereby formed. The foci of these systems may be extended over ranges of up to 30 cm. These systems are employed in the field of high-precision distance and contour measurement or, in the case of transparent bodies, also for thickness measurement of monolayer or multilayer substrates (as the difference of a plurality of distance measurements). In principle, these optics or lenses may also be used as optical arrangements having chromatic aberration for the present invention.

In the device according to the invention, a pulsed polychromatic laser beam may be converted by the chromatic aberration of the imaging optics (optical arrangement) wavelength-selectively into a corresponding intensity distribution along the focal line. By combining a spectral energy distribution of a laser source and a filter (filter functions), the intensity distribution in the working volume may be exactly adjusted along the focal line.

Particularly advantageous embodiments of the device according to the invention will be described below.

The means for generating a pulsed polychromatic laser beam preferably comprise at least one supercontinuum fiber lasers, or they comprise means for spectral broadening of the laser pulse, in particular means for amplifying chirped pulses (chirped pulse amplification).

In the case of amplifying chirped pulses, the laser pulse is spatially spread along the wavelength by means of gratings and then amplified. A thin-film transistor display (TFT display) before a grating may (with an energy loss) sharply block individual wavelength ranges. In this way, individual zones of the focal line may be blocked (filtered) in the laser beam direction. During amplification after the shadowing, the amplification power may be applied to the remaining wavelength ranges, so that the laser beam power decreases proportionally less than as originally shadowed in the case of a seeder. Injection seeding is a technique which is usually applied to pulsed lasers and optical parametric oscillators, usually with the main aim of achieving a narrower optical bandwidth (line width). This essentially means that the light from a seed laser, which is usually a single-frequency in continuous-wave operation, is fed into a Q-switched slave laser or into a nanosecond optical parametric oscillator at the start of a pulse buildup phase. Without this seed laser, the slave laser or OPO would normally emit on multiple resonator moments with optical amplification of comparable size, and the power distribution in the case of a plurality of modes may fluctuate from pulse to pulse. If the optical frequency of the seed laser light is close enough to the resonant frequency of a particular resonator mode of the slave apparatus, this mode may start with a much higher power than a very high power and may therefore greatly dominate in the output pulse. In this way, the emission bandwidth is drastically reduced compared with unimpeded (freely running) emission, and the temporal pulse profile may be smoother since mode collision is avoided.

The means for generating a pulsed polychromatic laser beam preferably provide at least the following: average laser power 5 to 120 watts, pulse duration of the laser beam less than 1 ns, preferably less than 1 ps, burst mode 12 to 48 ns, and wavelength range of the laser beam 350 nm to 2400 nm.

In one embodiment, the wavelength of the laser source (means for generating a pulsed polychromatic laser beam) is in this case restricted to a region in which the number of photons for bridging the bandgap remains constant.

Suitable means for generating a pulsed polychromatic laser beam, in particular laser sources, may be provided in a very wide variety of ways.

Figure 1:
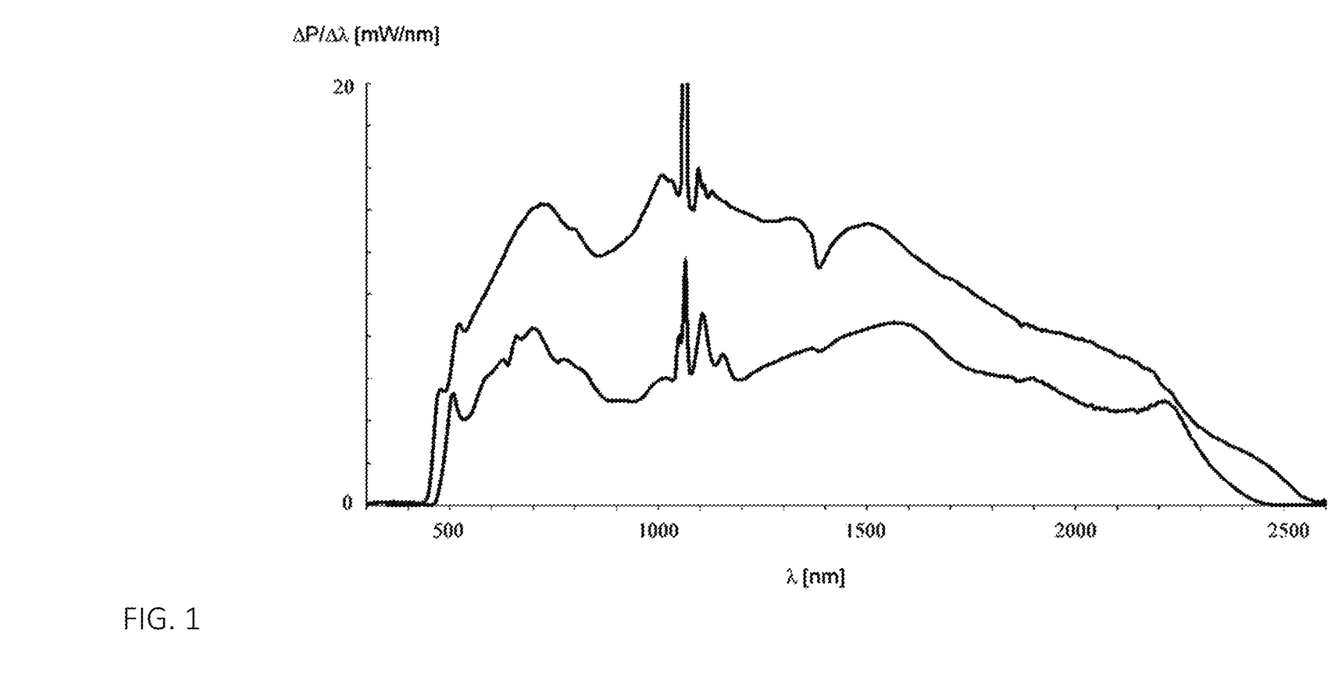
FIG. 1 shows the spectral power density of a typical white fiber laser.

Known supercontinuum fiber lasers emit, for example, pulses in the range of less than 10 ps with an average power of the laser of 20 watts over a wavelength range of from 350 nm 2400 nm. Power spectra distributed in such a way make it possible to process workpieces which, in the visible or near-infrared range, are transparent. FIG. 1 shows the spectral power density of a typical white fiber laser. The upper curve shows the profile for an average power of the laser of 20 watts. The lower curve shows the profile for an average power of the laser of 10 watts. The average power of the laser is given by integration.

Generation of another type of pulsed polychromatic laser beam is given by the relationship between spectral bandwidth $\Delta v$ and pulse duration $\Delta t$ $$\Delta v \Delta \tau \geq K \Leftrightarrow \Delta \tau \geq \frac{K}{\Delta v}$$

where K depends on the specific pulse shape according to

| Pulse shape | I(t) | K |
|---|---|---|
| Gaussian | $I(t) = e^{-4ln2 * \frac{t^2}{\Delta t}}$ | 0.441 |
| sech$^2$ | $I(t) = sech^2\left(\frac{1.76t}{\Delta t}\right)$ | 0.315 |

Here, $\Delta t$ is the pulse duration, the value of which is determined as a full width at half maximum (FWHM) of the intensity distribution I (t) and Dn is the spectral bandwidth/frequency width of the pulse at FWHM.

Figure 2:
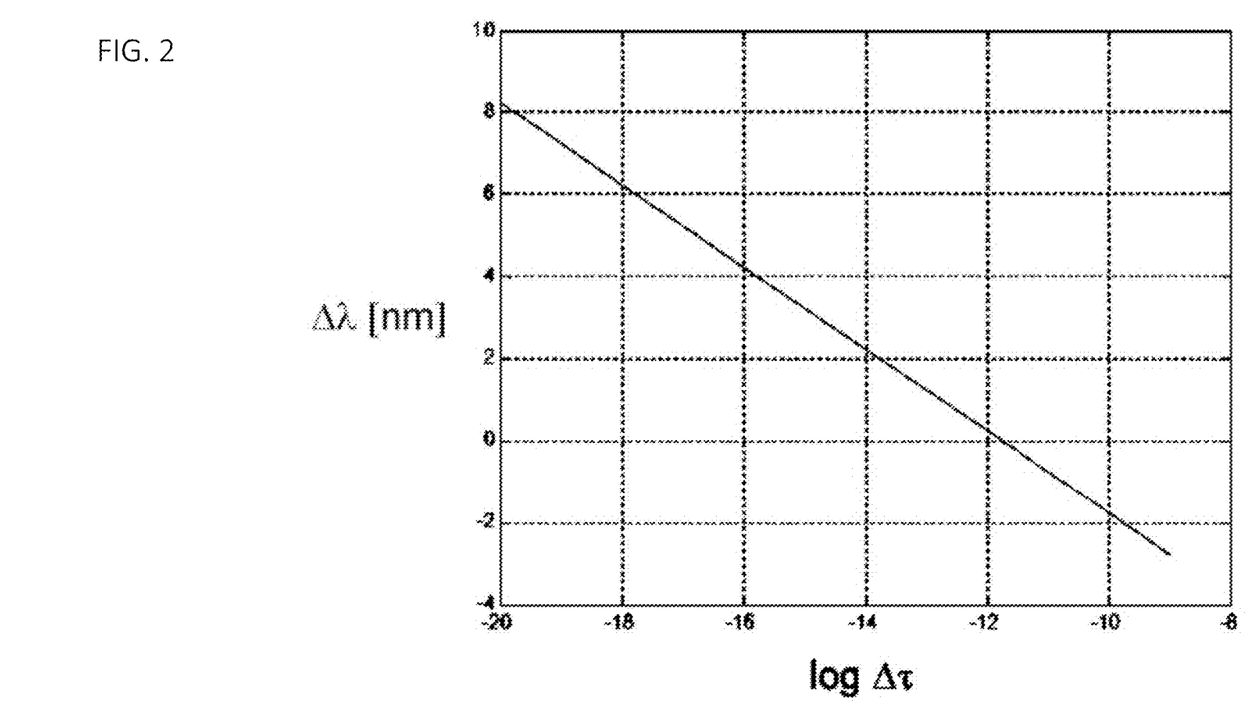
FIG. 2 shows spectral broadening of a pulse as a function of pulse width.

The following FIG. 2 shows the spectral broadening of the pulse $\Delta\lambda$ as a function of the pulse width $\Delta\tau$ in a log-log representation with a central wavelength of 1064 nm, the following calculation formula being used as a basis:

$$\Delta\lambda \geq \frac{K}{c} \frac{\lambda^2}{\Delta\tau}$$

At the transition from ps to fs pulses, broadening of the pulse to the order of magnitude n×100 nm is to be expected. Further shortening of the pulse duration to attosecond pulses in fact produces a white light distribution.

A disadvantage in this case is first that the interaction of the short fs pulse or attosecond pulse with the workpiece causes less and less damage in the material of the workpiece, so that the processability or separability of the workpiece decreases further and further (because of the short interaction time of the pulse (the photons), coupling to the phonons of the material cannot occur, so that direct heating of the material does not take place). Compensation may in this case be carried out by a significant increase in the number of burst mode pulses.

The optical arrangement having chromatic aberration preferably comprises at least one convex lens made of quartz glass, or it comprises at least two diffraction gratings.

Figure 3:
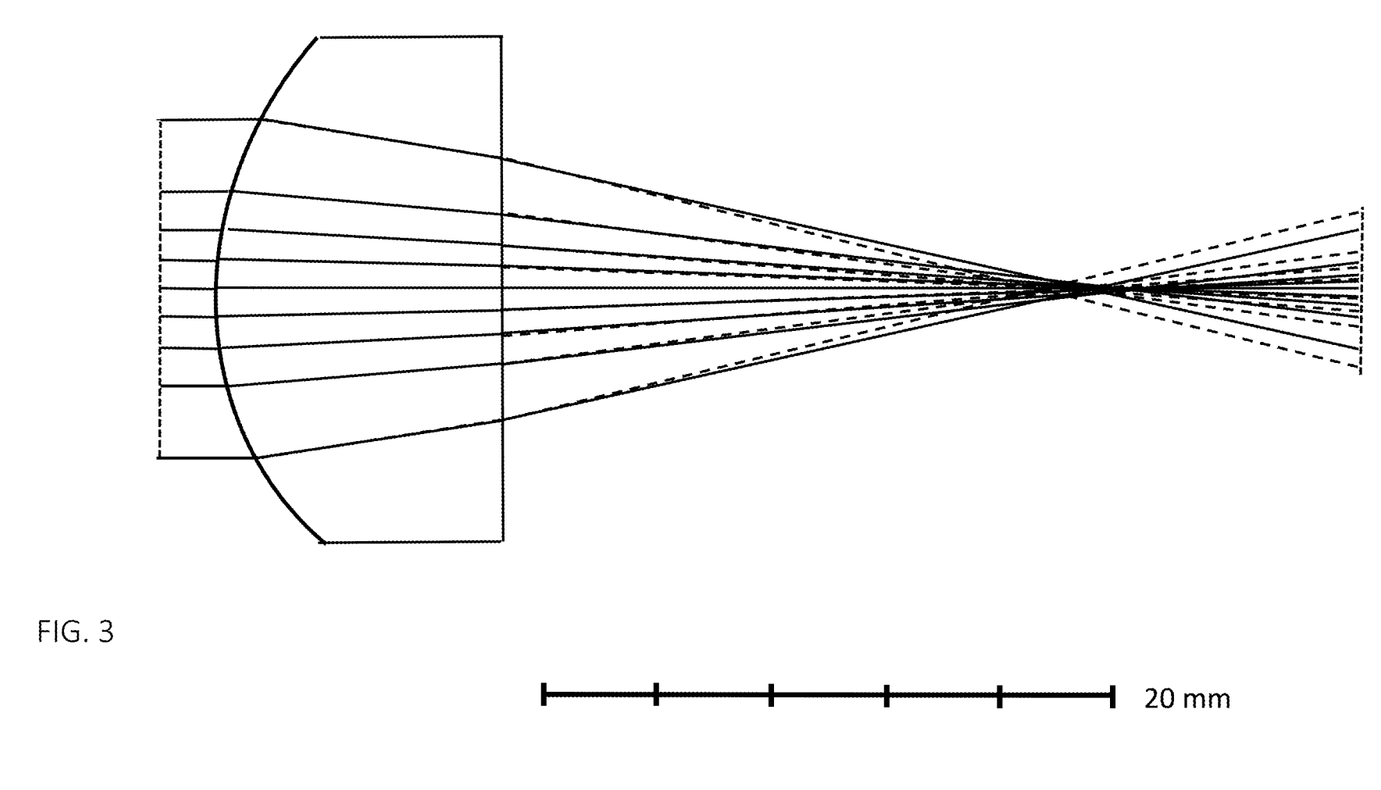
FIG. 3 shows shaping of a pulsed polychromatic laser beam with an optical arrangement having chromatic aberration, which comprises a convex lens made of quartz glass.
Figure 4:
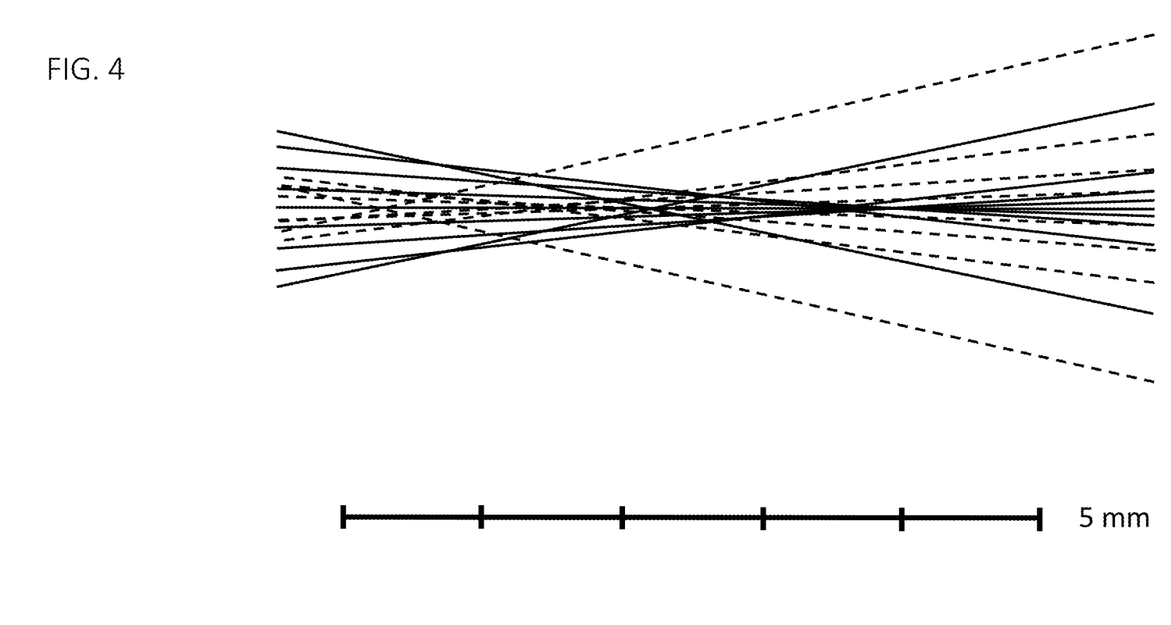
FIG. 4 shows an enlarged view of the focal line with the different foci.

Shaping of a pulsed polychromatic laser beam in the wavelength range of less than 800 nm with an optical arrangement having chromatic aberration, which comprises a convex lens made of quartz glass, is depicted in FIG. 3. An enlarged view of the focal line with the different foci is shown by FIG. 4. In this embodiment, the foci for 350 nm and 1000 nm differ by about 2 mm, i.e. the focal points of the wavelengths 350 nm and 1000 nm are separated from one another by about 2 mm. The focus may thus be shifted through this distance by spectral filtering. This distance shift may be calculated for different optical arrangements with commercially available ray tracing programs. Ray tracing is an algorithm based on the emission of rays for calculating masking, i.e. for determining the visibility of three-dimensional objects from a particular point in space. Ray tracing likewise refers to several extensions of this basic method, which calculate the further path of rays after striking surfaces. In optical simulation software, for example Zemax, the path of a field of light rays, which come from an object considered to be segmented, through the imaging optical system as far as the detector is represented.

Figure 5:
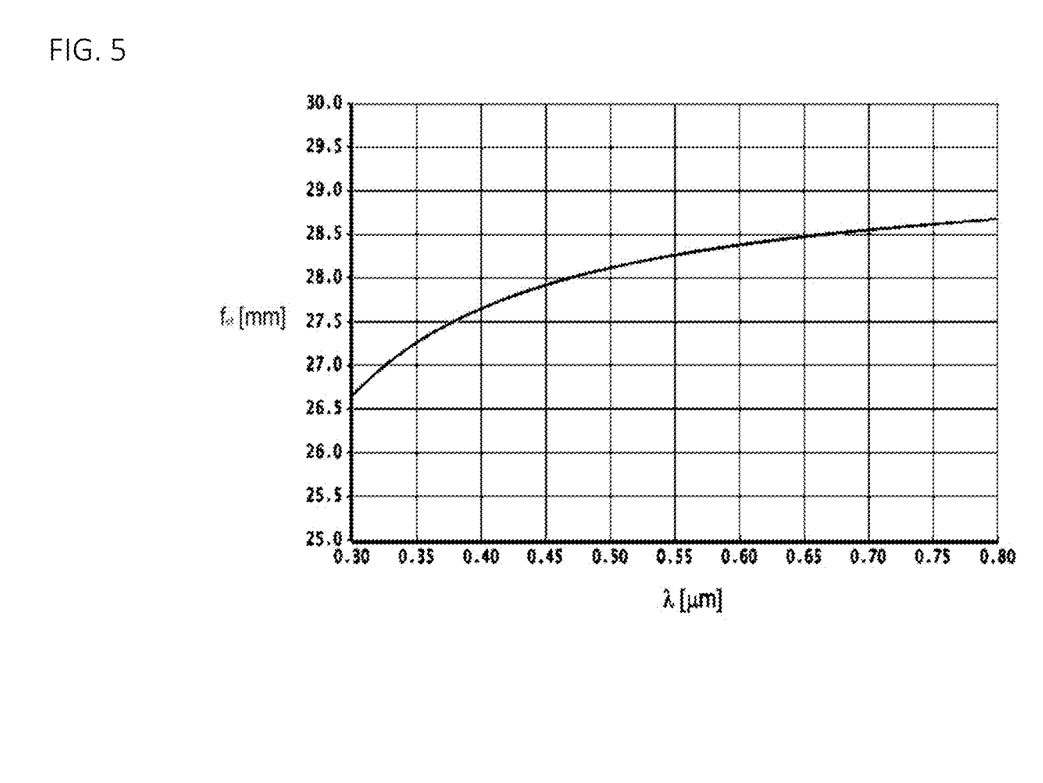
FIG. 5 shows the effective focal length of the system shown in FIG. 3.

FIG. 5 shows the effective focal length of the system shown in FIG. 3 in the wavelength range of from 0.30 μm to 0.80 μm (300 nm to 800 nm).

Figure 6:
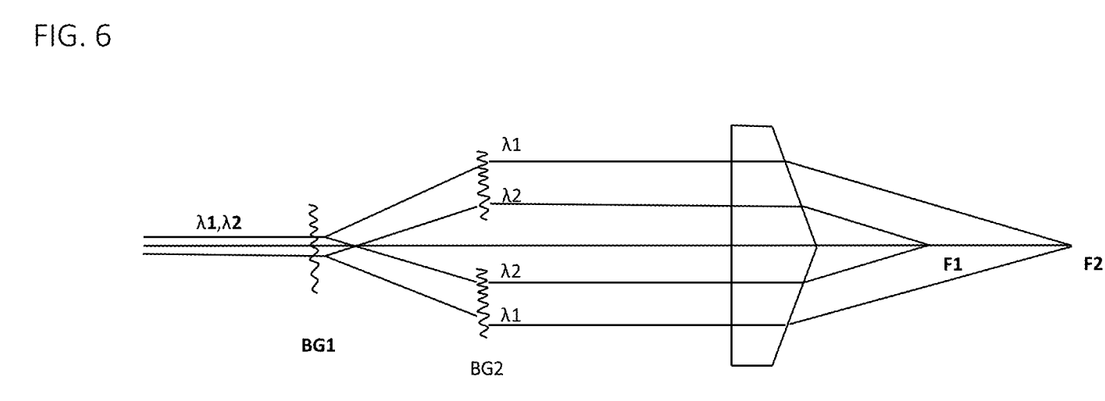
FIG. 6 shows a pulsed laser beam converted into a ring beam.

In a further embodiment (FIG. 6), the pulsed laser beam is converted by two diffraction gratings (BG1 and BG2) into a ring beam, in which the shorter wavelength of the beam spectrum $\lambda_1$ lies at the outer ring and the longer wavelength of the beam spectrum $\lambda_2$ lies at the inner ring. If this ring beam is then focused with axicon or similar optics, a plurality of foci F1 and F2 will be formed, the position of which depends on the wavelength.

The filter is preferably a band edge filter, in particular a highpass or lowpass filter.

The filter is preferably arranged before the optical arrangement having chromatic aberration in the beam path of the laser beam. It may, however, also be arranged after the optical arrangement having chromatic aberration in the beam path of the laser beam (it is, however, necessary to ensure that the filter does not protrude into the focal line). An arrangement of a plurality of filters before and/or after the optical arrangement is also possible.

By a plurality of filters, a plurality of wavelengths may be selectively filtered so that the focal line selectively does not have a focus at a plurality of positions.

Use of edge filters (highpass and lowpass) limits the outer positions of the focal line, and band-stops make it possible to block or inactivate individual regions of the focal line. The combination of spectral intensity distribution of the laser source with the filter curve of the filters used determines the intensity distribution of the laser beam on the entry side of the optical arrangement having chromatic aberration (mathematically: calculation of the convolution integral of the light intensity distribution and the filter curve). On the beam exit site, the chromatic aberration of the optical arrangement determines the intensity distribution reached.

The workpiece to be processed is preferably at least partially transparent for the laser wavelength range used, the transmission of the workpiece being in this more than 85%, preferably more than 90%, particularly preferably more than 95%.

The workpiece to be processed comprises in particular glass, glass ceramic or plastic.

The device is, in particular, a device for introducing a separating line along which the workpiece can be separated by external action, in particular by mechanical or thermal action.

The device is, in particular, a device for processing a workpiece stack or a workpiece laminate made of the same or different materials.

The object is also achieved by a method for processing a workpiece along a predetermined processing line, comprising at least the steps: generating a pulsed polychromatic laser beam, guiding the laser beam using an optical arrangement in order to generate a focal line along the beam direction of the laser beam, the optical arrangement having chromatic aberration for wavelength-dependent focusing of the laser beam and at least one filter for wavelength-dependent filtering of the laser beam, generating a relative movement between the laser beam and the workpiece along the predetermined processing line, in order to process the workpiece by means of action of the focused laser beam.

The method for processing a workpiece along a predetermined processing line thus comprises at least the following steps: generating a pulsed polychromatic laser beam, guiding the laser beam using an optical arrangement having chromatic aberration for wavelength-dependent focusing of the laser beam and at least one filter for wavelength-dependent filtering of the laser beam, in order to generate a focal line along the beam direction, generating a relative movement between the laser beam and the workpiece along the predetermined processing line, in order to process the workpiece by means of action of the focused laser beam (laser beam focal line).

Preferably, the pulsed polychromatic laser beam is generated by means of a supercontinuum fiber laser or by means of spectral broadening of the laser pulse, in particular by means of amplifying chirped pulses.

At least the following are preferably adjusted during the generation of the laser beam: pulse duration of the laser beam less than 1 ns, preferably less than 1 ps; burst mode 12 to 48 ns; wavelength range of the laser beam 350 nm to 2400 nm.

At least one convex lens made of quartz glass or at least two diffraction gratings may preferably be used as an optical arrangement having chromatic aberration.

A band edge filter, in particular a highpass or lowpass filter, may preferably be used as the filter.

A workpiece which is at least partially transparent for wavelengths of the laser, and comprises glass, glass ceramic or plastic, is preferably processed.

The method is preferably a method for introducing a separating line along which the workpiece can be separated by external action, in particular by mechanical or thermal action.

The method is preferably a method for processing a workpiece stack or a workpiece laminate made of the same or different materials.

The present invention will be further clarified with the aid of the following exemplary embodiments.

Figure 7:
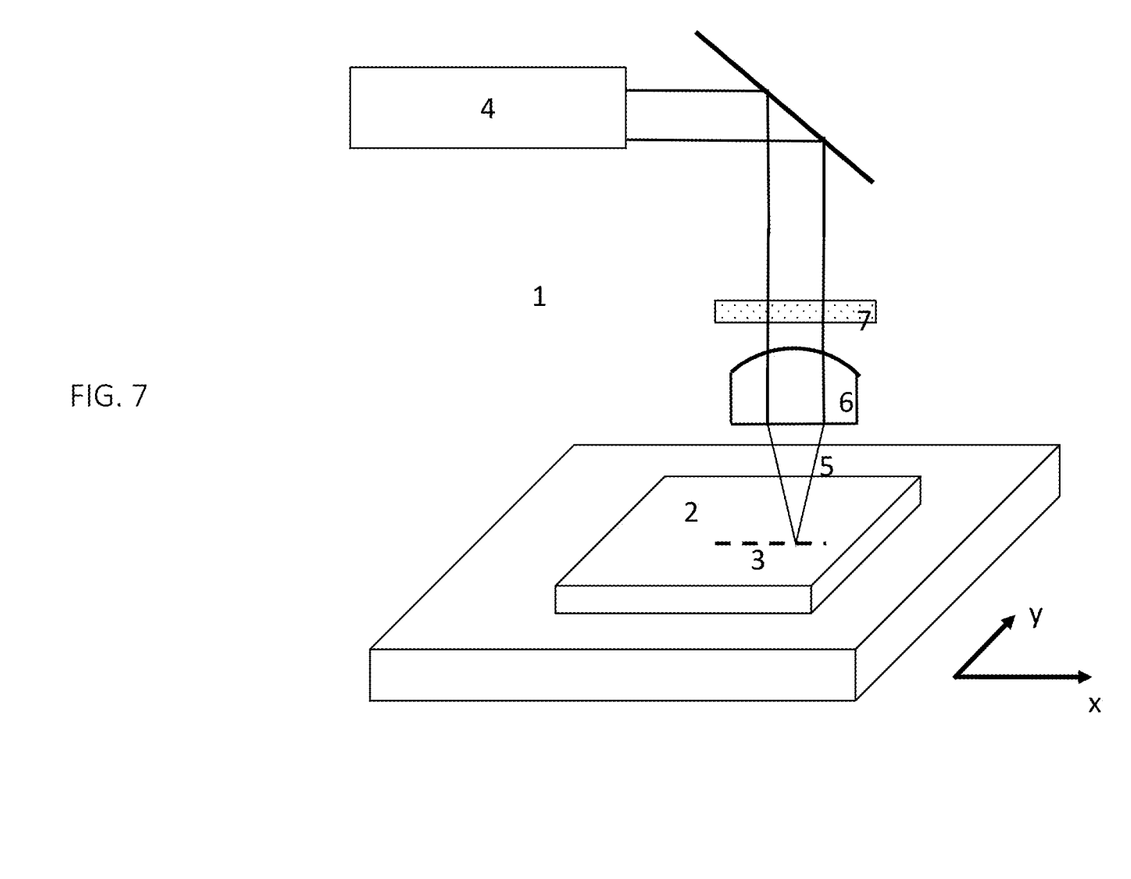
FIG. 7 shows a device for processing a workpiece according to the present disclosure.

FIG. 7 shows a device (1) for processing a workpiece (2) along a predetermined processing line (3) the device (1) comprising the following means: means (4) for generating a pulsed polychromatic laser beam (5), an optical arrangement (6) having chromatic aberration for wavelength-dependent focusing of the laser beam (5) and having at least one filter (7) for wavelength-dependent filtering of the laser beam (5), in order to generate a focal line (8) along the beam direction (Z direction) of the laser beam, means for generating a relative movement (not represented) between the laser beam (5) and the workpiece (2) along the predetermined processing line (3), in order to process the workpiece (2) by means of action of the focal line (8) of the laser beam (5).

Figure 8:
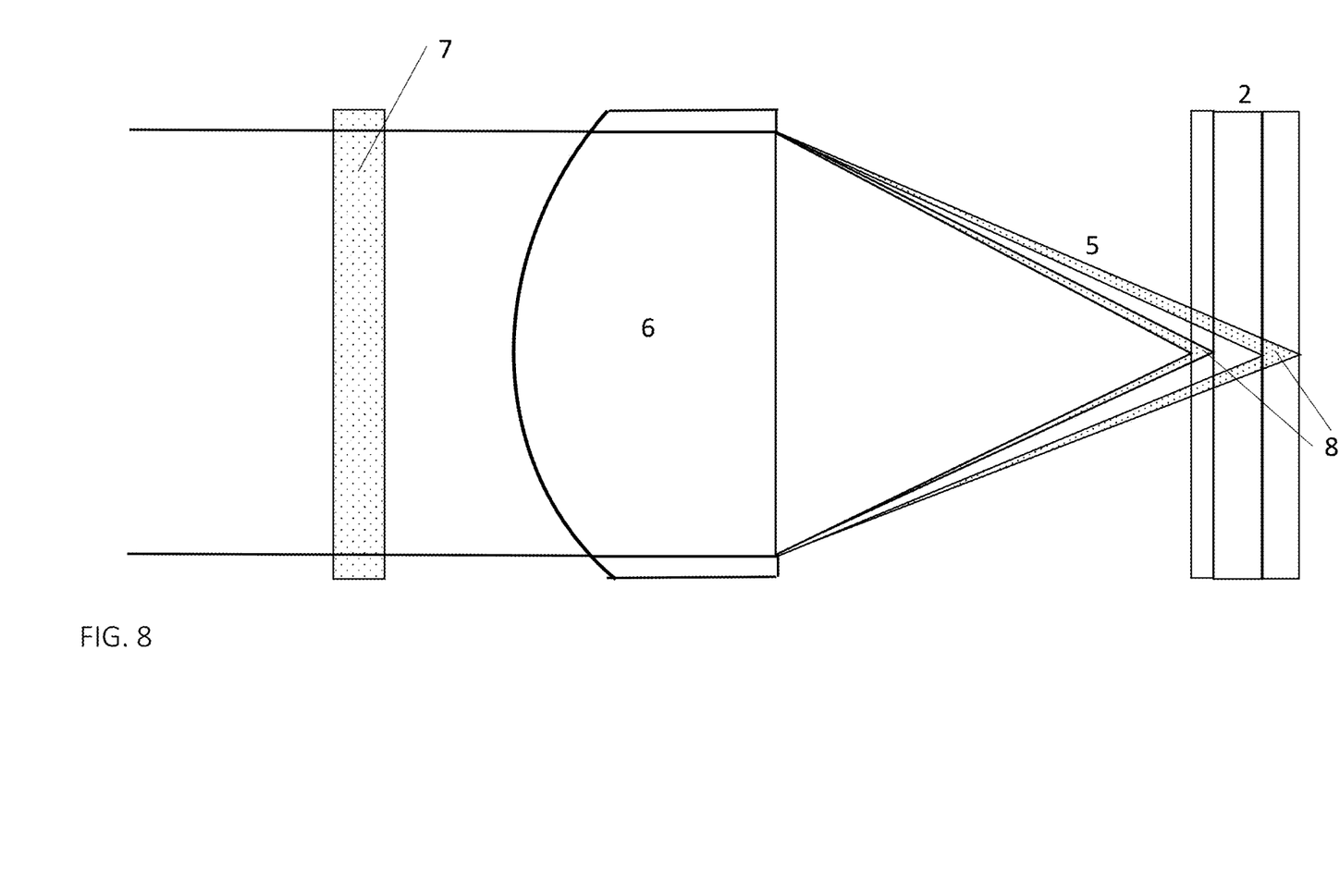
FIG. 8 shows the processing of a workpiece along a predetermined processing line.

The advantage of the present invention is represented in FIG. 8: the processing of a workpiece along a predetermined processing line by means of pulsed laser beams, the processing depth being selectively adjusted.

What is claimed is:

1. A method for processing a workpiece along a predetermined processing line, comprising:
   generating a pulsed polychromatic laser beam with a pulse duration of less than 1 ps and a wavelength in the range of 350 nm to 2400 nm;
   guiding the laser beam using an optical arrangement in order to generate a focal line along a beam direction of the laser beam, the optical arrangement having chromatic aberration for wavelength-dependent focusing of the laser beam; and
   generating a relative movement between the laser beam and the workpiece along the predetermined processing line, in order to process the workpiece by the laser beam, wherein the workpiece comprises a material selected from a group consisting of glass, glass ceramic, and plastic, wherein the material is at least partially transparent for wavelengths of the laser beam, wherein the depth of processing of the workpiece along the predetermined processing line is adjusted.

2. The method of claim 1, wherein the laser beam is generated by a generator device selected from a group consisting of: a supercontinuum fiber laser, a spectral broadener, and a chirped pulse amplifier.

3. The method of claim 1, further comprising controlling the laser beam to provide an attribute selected from a group consisting of: an average laser power of 5 to 120 watts, a burst mode of 12 to 48 ns, a wavelength range of 350 nm to 2400 nm, and any combinations thereof.

4. The method of claim 1, wherein the chromatic aberration for wavelength-dependent focusing of the laser beam comprises a convex lens made of quartz glass or two diffraction gratings.

5. The method of claim 1, wherein the filter is selected from a group consisting of: a band edge filter, a highpass filter, and lowpass filter.

6. The method of claim 1, further comprising separating the workpiece along the predetermined processing line by external action.

7. The method of claim 6, wherein the external action comprises mechanical action or thermal action.

8. The method of claim 1, wherein the workpiece comprises a stack of workpieces or a workpiece laminate.

9. The method of claim 1, further comprising applying a nonlinear interaction between an electromagnetic field of the laser beam and the workpiece so that the laser beam self-focuses.

10. The method of claim 1, further comprising spectrally broadening a pulse of the laser beam as a function of the pulse width according to the equation $$\Delta\lambda \geq \frac{K}{c}\frac{\lambda^2}{\Delta\tau},$$

with K being 0.441 for a Gaussian pulse shape and K being 0.315 for a sech2-shaped pulse and $\Delta\tau$ being the pulse width.

11. The method of claim 1, further comprising a wavelength dependent filtering of the laser beam by a filter.

12. The method of claim 1, further comprising controlling the laser beam to provide an average laser power of 5 to 120 watts.

13. A method for processing a workpiece along a predetermined processing line, comprising:
   providing the workpiece that is at least partially transparent for a wavelength range;
   generating a pulsed polychromatic laser beam in the wavelength range and with a pulse duration of less than 1 ps and a wavelength in the range of 350 nm to 2400 nm;
   passing the pulsed polychromatic laser beam through at least one filter for wavelength-dependent filtering of the laser beam, wherein the at least one filter is located only before an optical arrangement;
   guiding the laser beam onto the workpiece using the optical arrangement having chromatic aberration for wavelength-dependent focusing of the laser beam such that an elongated focal line along a beam direction of the laser beam is generated and a filament is introduced within the workpiece; and
   generating relative movement between the pulsed polychromatic laser beam and the workpiece along the predetermined processing line, in order to process the workpiece by the laser beam, wherein the depth of processing of the workpiece along the predetermined processing line is adjusted.

14. The method of claim 13, wherein the length of the filament is at least partially dependent on the chromatic aberration.

15. The method of claim 1, wherein the pulsed polychromatic laser beam further has an average laser power of 5 to 120 watts.

16. The method of claim 1, wherein the pulsed polychromatic laser beam further has a burst mode of 12 ns to 48 ns.

17. A method for processing a workpiece along a predetermined processing line, comprising:
   providing the workpiece that is at least partially transparent for a wavelength range of an ultrashort pulsed polychromatic laser beam with a pulse duration of less than 1 ps and a wavelength in the range of 350 nm to 2400 nm,
   wherein the laser beam has a pulse that is spectrally broadened as a function of the pulse width according to the equation $$\Delta\lambda \geq \frac{K}{c}\frac{\lambda^2}{\Delta\tau},$$

with K being 0.441 for a Gaussian pulse shape and K being 0.315 for a sech2-shaped pulse and $\Delta T$ being the pulse width;
   passing the pulsed polychromatic laser beam through at least one filter for wavelength-dependent filtering of the laser beam;
   guiding the laser beam onto the workpiece using the optical arrangement having chromatic aberration for wavelength-dependent focusing of the laser beam so that an elongated focal line along a beam direction of the laser beam is generated and a filament is introduced within the workpiece; and
   generating relative movement between the pulsed polychromatic laser beam and the workpiece along the predetermined processing line, in order to process the workpiece by the laser beam.

18. The method according to claim 17, wherein the pulsed polychromatic laser beam is passed through at least one filter for wavelength-dependent filtering of the laser beam, and wherein the length or depth of processing of the workpiece along the predetermined processing line is adjusted.

19. The method according to claim 17, wherein the workpiece is selected from the group consisting of glass, glass-ceramics, and plastics.

20. The method according to claim 1, further comprising, between the first generating step and the guiding step, the step of passing the pulsed polychromatic laser beam through at least one filter for wavelength-dependent filtering of the laser beam, wherein the at least one filter is located only before an optical arrangement.

* * * * *